US008238323B2

(12) United States Patent
Koc

(10) Patent No.: US 8,238,323 B2
(45) Date of Patent: Aug. 7, 2012

(54) OFDMA CELLULAR NETWORK AND METHOD FOR MITIGATING INTERFERENCE

(75) Inventor: Ali Taha Koc, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 12/483,126

(22) Filed: Jun. 11, 2009

(65) Prior Publication Data

US 2010/0317339 A1    Dec. 16, 2010

(51) Int. Cl.
H04L 12/28    (2006.01)
(52) U.S. Cl. ........................................ 370/351
(58) Field of Classification Search .................. None
See application file for complete search history.

(56) References Cited

U.S. PATENT DOCUMENTS

| | | | | |
|---|---|---|---|---|
| 7,230,931 | B2 * | 6/2007 | Struhsaker | 370/280 |
| 7,355,962 | B2 * | 4/2008 | Li et al. | 370/208 |
| 8,023,462 | B2 * | 9/2011 | Tao et al. | 370/329 |
| 8,036,098 | B2 * | 10/2011 | Pereira et al. | 370/201 |
| 2006/0262768 | A1 * | 11/2006 | Putzolu | 370/344 |
| 2006/0292989 | A1 | 12/2006 | Gerlach et al. | |
| 2007/0008916 | A1 * | 1/2007 | Haugli et al. | 370/320 |
| 2007/0104085 | A1 * | 5/2007 | Sambhwani et al. | 370/203 |
| 2007/0149242 | A1 | 6/2007 | Kim et al. | |
| 2008/0062953 | A1 * | 3/2008 | Li et al. | 370/343 |
| 2009/0232105 | A1 * | 9/2009 | Kesselman et al. | 370/336 |
| 2009/0264142 | A1 * | 10/2009 | Sankar et al. | 455/501 |
| 2009/0279498 | A1 * | 11/2009 | Li et al. | 370/329 |
| 2009/0285134 | A1 * | 11/2009 | Struhsaker et al. | 370/280 |
| 2010/0172311 | A1 * | 7/2010 | Agrawal et al. | 370/329 |
| 2010/0227618 | A1 * | 9/2010 | Yang et al. | 455/438 |

FOREIGN PATENT DOCUMENTS

| | | |
|---|---|---|
| KR | 2007-0048424 | 5/2007 |
| WO | WO-2010144182 A1 | 12/2010 |

OTHER PUBLICATIONS

"International Application Serial No. PCT/US2010/032254, Search Report mailed Nov. 22, 2010", 3 pgs.
"International Application Serial No. PCT/US2010/032254, Written Opinion mailed Nov. 22, 2010", 3 pgs.
"International Application Serial No. PCT/US2010/032254, International Preliminary Report on Patentability mailed Dec. 22, 2011", 5 pgs.

* cited by examiner

*Primary Examiner* — Chi Pham
*Assistant Examiner* — Fan Ng
(74) *Attorney, Agent, or Firm* — Schwegman, Lundberg & Woessner, P.A.; Gregory J. Gorrie

(57) ABSTRACT

Embodiments of an OFDMA cellular network and method for mitigating interference are generally described herein. In some embodiments, the scheduler assigns a common group ID to mobile stations based on interference levels of a common interference source and allocates bandwidth within a selected zone of an OFDMA uplink subframe to the mobile stations assigned the common group ID for uplink communications within the uplink subframe. In some joint-scheduling embodiments, a neighbor base station that is identified as the common interference source may refrain from assigning bandwidth within the selected zone to at least some of its associated mobile stations that have identified the serving base station as an interference source.

16 Claims, 5 Drawing Sheets

OFDMA CELLULAR NETWORK

OFDMA CELLULAR NETWORK

OFDMA CELLULAR NETWORK AND METHOD FOR MITIGATING INTERFERENCE

TECHNICAL FIELD

Embodiments pertain to radio resource management in wireless networks. Some embodiments pertain to cellular networks that use an orthogonal-frequency division multiplex access (OFDMA) communication technique. Some embodiments pertain to Worldwide Interoperability for Microwave Access (WiMAX) networks, including networks that operate in accordance with one of the Institute of Electrical and Electronics Engineers (IEEE) 802.16 standards. Some embodiments pertain to 3rd Generation Partnership Project (3GPP) Universal Terrestrial Radio Access Network (UTRAN) Long-Term Evolution (LTE) networks.

BACKGROUND

A cellular network is a radio network made up of a number of cells each served by at least one fixed-location transceiver known as a cell site or base station. These cells cover different geographic areas to provide radio coverage over a wider area than the area of one cell. This allows mobile stations to move through more than one cell while communicating with the network. Increased capacity in a cellular network is provided through the reuse of the same frequency range in different cells. Unfortunately, there is some interference from the signals of other cells which use the same frequency range. In conventional frequency division multiplexed (FDM) cellular systems, at least one cell gap is generally provided between cells which reuse the same frequency range to help reduce this interference. In other words, adjacent cells are configured to use different frequency ranges.

Unfortunately, some cellular networks do not have the luxury of being able to use different frequency ranges in adjacent cells. In these cellular networks, the frequency reuse factor is one. Since neighboring cells use the same frequency range, one issue with these cellular networks is interference near cell edges caused by the communications within neighboring cells. This interference is particularly a concern on the uplink in OFDMA cellular networks because of the limited power available to mobile stations and the use of non-directional antennas for uplink transmissions. Thus there are general needs for OFDMA cellular networks and methods that can reduce interference on the uplink.

DETAILED DESCRIPTION

The following description and the drawings sufficiently illustrate specific embodiments to enable those skilled in the art to practice them. Other embodiments may incorporate structural, logical, electrical, process, and other changes. Embodiments set forth in the claims encompass all available equivalents of those claims.

Figure 1:
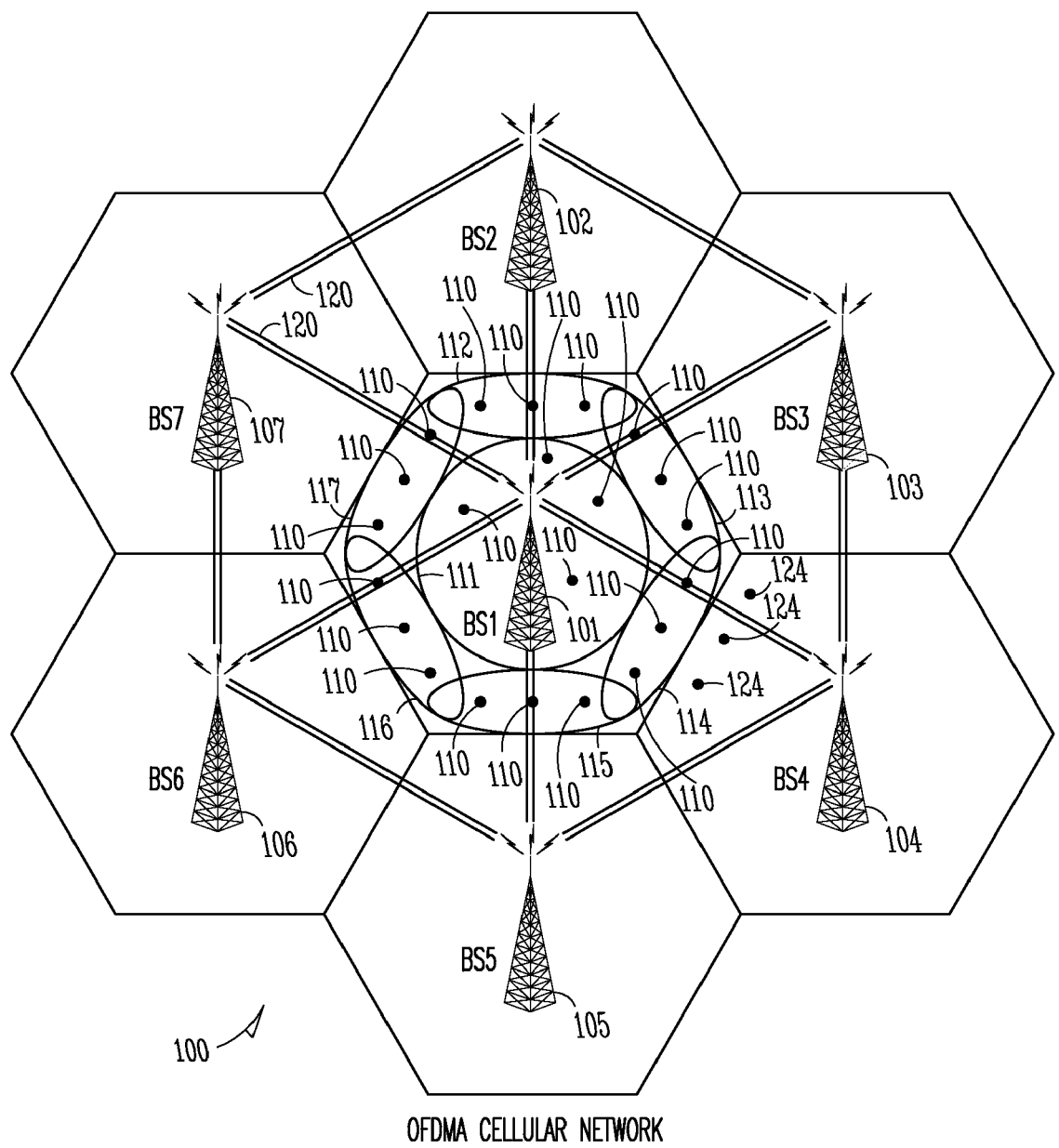
FIG. 1 illustrates an OFDMA cellular network in accordance with some embodiments.

FIG. 1 illustrates an OFDMA cellular network in accordance with some embodiments. OFDMA cellular network 100 includes base stations 101-107 arranged in a cellular reuse pattern in which each base station services mobile stations substantially within a cell. Cellular network 100 may also include backbone network 120 to provide for communications between base stations 101-107. As illustrated in FIG. 1, base station 101 (BS1) may serve mobile stations 110 within the central cell. One issue with OFDMA cellular network 100 is that mobile stations 110 that are located near cell edges may experience interference from transmissions in neighbor cells. For example, mobile stations 110 within cell-edge region 112 may experience interference from communications with base station 102 (BS2), and mobile stations 110 within cell-edge region 113 may experience interference from communications with base station 103 (BS3). Mobile stations 110 within cell-edge region 114 may experience interference from communications with base station 104 (BS4), and mobile stations 110 within cell-edge region 115 may experience interference from communications with base station 105 (BS5). Mobile stations 110 within cell-edge region 116 may experience interference from communications with base station 106 (BS6) and mobile stations 110 within cell-edge region 117 may experience interference from communications with base station 107 (BS7). This interference is particularly a concern on the uplink because of the limited power available to mobile stations and the use of non-directional antennas for uplink transmissions by the mobile stations.

In accordance with embodiments, base stations 101-107 are configured to mitigate uplink interference by creating orthogonal zones in time and/or frequency to reduce interference. Base stations 101-107 may assign a common group identifier (ID) to some of their associated mobile stations based on interference levels of a common interference source. Base stations 101-107 may also allocate bandwidth within a selected zone of an OFDMA uplink subframe to the mobile stations that are assigned the common group ID for uplink communications with their serving base station within the uplink subframe. In these embodiments, mobile stations having similar interference levels from the same interference source (e.g., a neighbor base station) may be assigned the same group ID. Mobile stations having similar interference levels from the same interference source, for example, are likely to be located at or near cell edges. For example, mobile stations 110 served by base station 101 in cell-edge region 114 may identify neighbor base station 104 as a common interference source. Accordingly, mobile stations 110 in cell-edge region 114 may be assigned a common group ID.

In joint-scheduling embodiments, a neighbor base station that is identified as the common interference source may refrain from assigning bandwidth within the uplink subframe zone that is assigned by a serving base station in a neighbor cell to at least some of its associated mobile stations that have identified the serving base station in a neighbor cell as an interference source. For example, mobile stations 124 may be associated with neighbor base station 104. Mobile stations 124 may identify base station 101 as an interference source. Neighbor base station 104 may therefore refrain from assigning uplink bandwidth (to at least some of mobile stations 124) for uplink communications that is within the zone allocated by base station 101 to mobile stations 110 within cell-edge region 114. Neighbor base station 104 may assign bandwidth to at least some mobile stations 124 for uplink communications within a different zone of the OFDMA uplink subframe, although this is not a requirement. In this way, mobile stations associated with different base stations located at or near a common cell edge may be assigned bandwidth within different uplink zones to help mitigate uplink interference and provide for increase uplink throughput. Because of the reduced uplink interference levels, power consumption may also be reduced because mobile stations may be able to transmit uplink subframes at a lower transmit power while meeting minimum signal-to-noise ratio (SNR) and/or bit-error-rate (BER) requirements. These joint-scheduling embodiments are described in more detail below.

Although many of the embodiments described herein address mitigating interference on the uplink, interference may also be mitigated on the downlink in the substantially same way. Interference on the downlink, however, is less of an issue for mobile stations located at or near cell edges.

In some embodiments, cellular network 100 may be a WiMAX cellular network and the base station is configured to communicate with the mobile stations in accordance with one of the IEEE 802.16 specifications using an OFDMA technique comprising time-division multiplexed downlink and uplink subframes. In some embodiments, cellular network 100 may be a WiMAX network configured to operate in accordance with the IEEE 802.16 Task Group m (IEEE 802.16m) specification with a frequency reuse pattern of one.

In some embodiments, cellular network 100 may be a 3GPP UTRAN LTE cellular network and the base station is configured to communicate with the mobile stations in accordance with one of the 3GPP UTRAN LTE communication standards. In these 3GPP UTRAN LTE embodiments, the mobile stations may be configured to transmit uplink subframes to an associated base station using single-carrier uplinks and the base stations 101-107 may communicate within downlink subframes using multicarrier downlinks.

In some embodiments, the mobile stations may be either fixed or portable wireless communication devices, such as a personal digital assistants (PDA), laptops or portable computers with wireless communication capability, web tablets, wireless or cellular telephones, wireless headsets, pagers, instant messaging devices, access points, televisions, medical devices (e.g., a heart rate monitor, a blood pressure monitor, etc.), or other devices that may receive and/or transmit information wirelessly. In some embodiments, the mobile stations and the base stations 101-107 may use more than one antenna to communicate. The antennas may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result therebetween.

Figure 2:
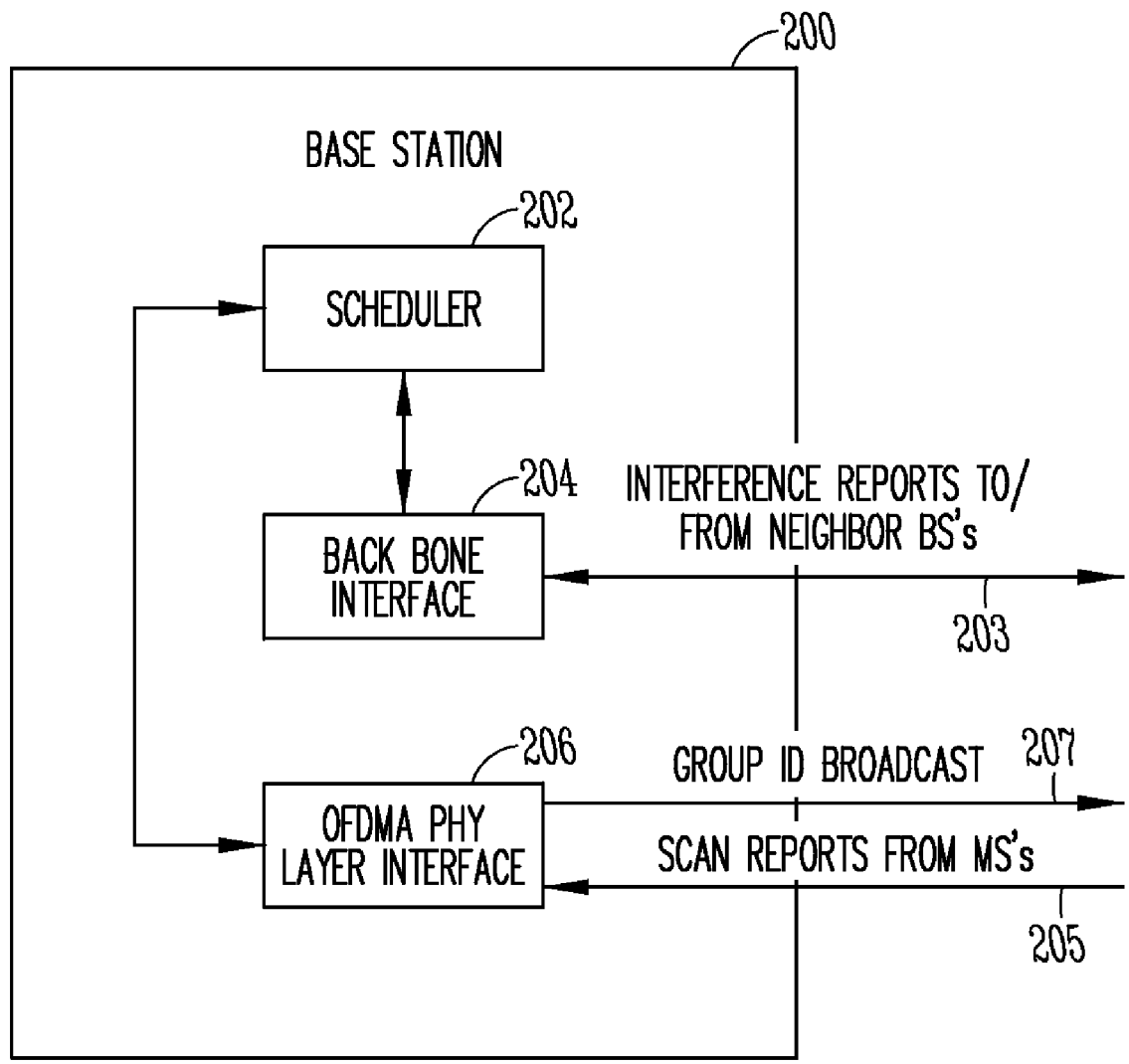
FIG. 2 is a simplified block diagram of a base station in accordance with some embodiments.

FIG. 2 is a simplified block diagram of a base station in accordance with some embodiments. Base station 200 may be suitable for use as any one of base stations 101-107 (FIG. 1). Base station 200 may include a scheduler 202 to schedule communications with associated mobile stations, a backbone interface 204 to communicate with other base stations over the backbone network 120 (FIG. 1), and an OFDMA physical (PHY) layer interface 206 for communicating with mobile stations in accordance with an OFDMA communication technique. The scheduler 202 may be configured to perform various operations as described in more detail below.

In accordance with embodiments, scan reports 205 may be received through the backbone interface 204 from associated mobile stations. The scan reports 205 may identify one or more interference sources and the interference level associated with at least one of the interference sources. The scheduler 202 may identify common interference sources based on an identity of the interference sources from the scan reports 205.

In some embodiments, the mobile stations send base-station identifiers (BSIDs) of the base stations that are identified as interference sources. In these embodiments, the mobile stations may send the BSIDs ordered in the scan reports 205 based on the interference level (e.g., highest received power first, lowest received power last). The first BSID identified in a scan report 205 may identify the predominant interference source which may be used by the scheduler 202 in identifying common interference sources and for assigning a common group ID to some of the mobile stations.

In some embodiments, the mobile stations may identify one or more neighbor base stations as interference sources based on the BSID received from a broadcast channel of a neighbor base station. The mobile stations may calculate a received power level in the downlink for use in generating the interference level for including in the scan reports 205. The mobile stations may periodically scan for the broadcast channels of neighbor base stations and may calculate the received power level in the downlink. Under the assumption of downlink/uplink reciprocity, interference levels in the uplink may be estimated.

In some embodiments, the scheduler 202 may assign a common group ID to the mobile stations with a common interference source when the interference level of the common interference source is above a predetermined threshold. When the interference level from a common interference source is not above a predetermined threshold, the scheduler 202 may refrain from assigning a common group ID to these mobile stations. The mobile stations that have not identified a common interference source with high enough interference levels may not necessarily be near cell edges and/or their interference levels may not be great enough to result in a significant reduction in uplink throughput.

In some embodiments, the scheduler 202 may provide a group ID broadcast message 207 for transmission via the OFDMA PHY layer interface 206. The group ID broadcast message 207 may be transmitted to the mobile stations that are assigned the common group IDs. The group ID broadcast message 207 may include the assigned group ID, power control settings, and frequency assignments for each of the mobile stations assigned the common group ID. In this way, power control settings and frequency assignments may be done at the group ID level rather than individually reducing the amount of bandwidth conventionally used to convey this information. In these embodiments, the mobile stations that are assigned a common group ID are configured to receive their power control and frequency assignment by listening for their assigned common group ID.

In some embodiments, the scheduler 202 may generate interference reports 203 for transmission to the neighbor base stations that are identified as common interference sources. The interference reports 203 may be transmitted over the backbone network 120. An interference report 203 may identify the selected zone of the OFDMA uplink subframe that a serving base station has assigned to its associated mobile stations that have identified the same neighbor base station as the common interference source. Interference reports 203 may also be received from neighbor base stations.

The scan reports 205 may be received through the OFDMA PHY interface 206 and provided to the scheduler 202 and the group ID broadcast messages 207 may be broadcasted to the mobile stations using the OFDMA PHY interface 206. The interference reports 203 may be received and transmitted to and from backbone network 120 (FIG. 1) using the backbone interface 204.

Although the base station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the base station 200 may refer to one or more processes operating on one or more processing elements.

Figure 3:
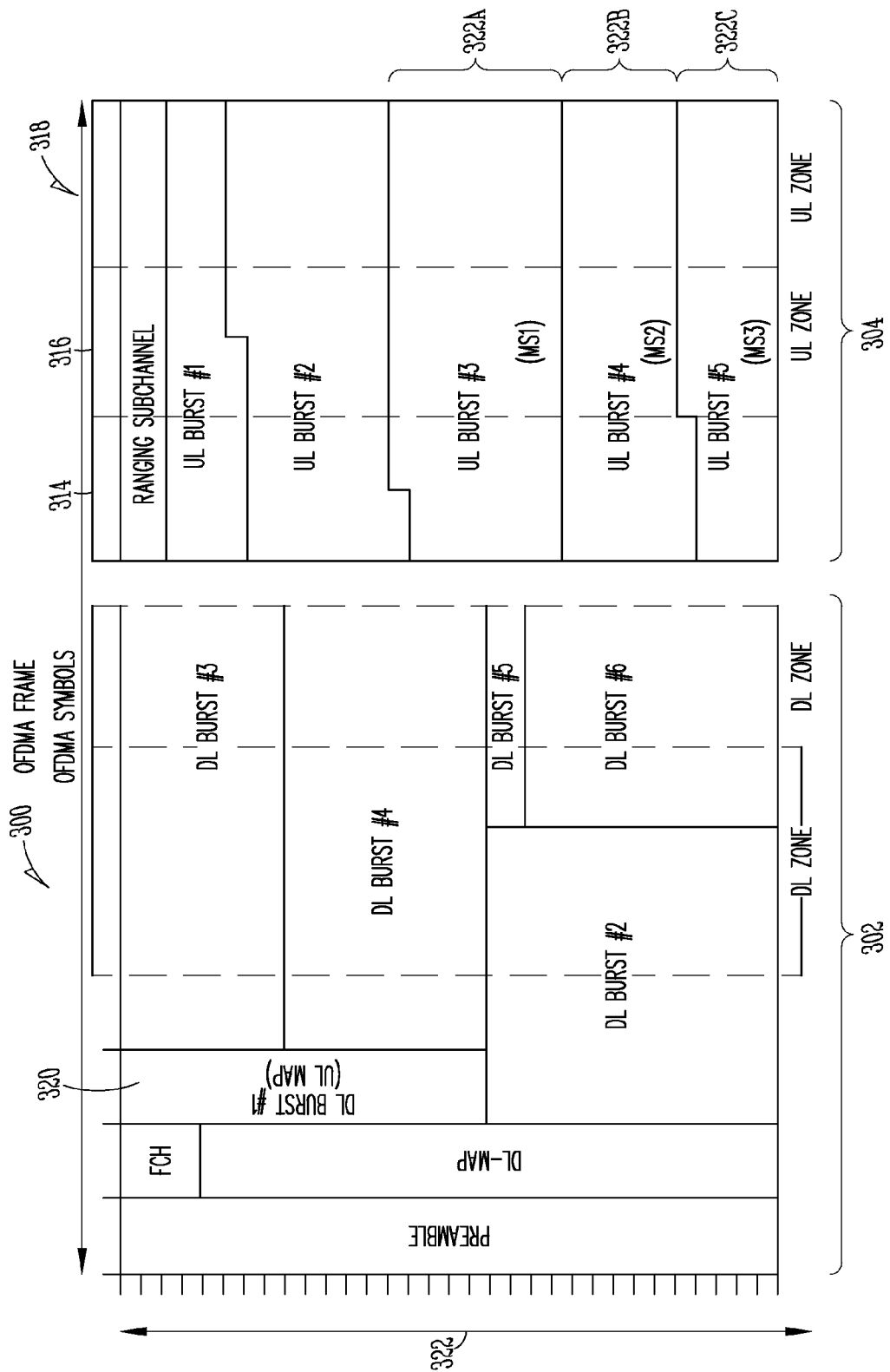
FIG. 3 illustrates an OFDMA frame in accordance with some embodiments.

FIG. 3 illustrates an OFDMA frame in accordance with some embodiments. OFDMA frame 300 includes a downlink subframe 302 and an uplink subframe 304. In time-division duplexed (TDD) embodiments, the downlink subframe 302 and the uplink subframe 304 may be time-division multiplexed (i.e., transmitted at different times) and may utilize the same sets of subcarriers 322. In frequency division duplexed (FDD) embodiments, the downlink subframe 302 and the uplink subframe 304 may be frequency division multiplexed using separate orthogonal sets of frequency tones and may be transmitted concurrently.

OFDMA downlink subframe 302 may include a preamble portion, a downlink map, an uplink map 320 and a plurality of downlink bursts. OFDMA uplink subframe 304 may include a ranging subchannel as well as a plurality of uplink bursts.

In accordance with embodiments, the scheduler 202 (FIG. 2) of base station 200 may allocate bandwidth within a selected zone of OFDMA uplink subframe 304, such as zone 316, to the mobile stations that have been assigned a common group ID for uplink communications with the base station 200. In these embodiments, mobile stations are assigned a common group ID based on interference levels of a common interference source.

Within the allocated zone 316, the allocated bandwidth may comprise an orthogonal channel resource that is allocated to each of the mobile stations assigned the common group ID. For example, the uplink map 320 may identify the orthogonal channel resource and may be generated by the scheduler 202 for inclusion in the downlink subframe 302. For example, the scheduler 202 may assign uplink zone 316 to mobile stations with the common group ID #1. When there are three mobile stations (i.e., MS1, MS2 and MS3) in group ID #1, each mobile station may be assigned an orthogonal channel resource in uplink zone 316. As illustrated in FIG. 3, MS1 may be assigned a channel resource that comprises subcarrier frequencies 322A, MS2 may be assigned a channel resource that comprises subcarrier frequencies 322B, and MS3 may be assigned a channel resource that comprises subcarrier frequencies 322C. Uplink zone 316 may include all frequency channels (shown in the y-direction) and a portion of OFDMA symbols (shown in the time or x-direction).

In accordance with some embodiments, the scheduler 202 may assign an orthogonal channel resource to each of the mobile stations with a common group ID based on a channel response determined from a channel sounding signal transmitted by the mobile stations. In these embodiments, the mobile stations may be configured to transmit a channel sounding signal to allow the scheduler 202 to determine which subcarriers 322 are preferable. Using this channel sounding signal, the scheduler 202 may assign different sets of subcarrier frequencies to each mobile station having the same group ID. Based on the channel sounding signal, the scheduler 202 may select subcarrier frequencies 322A for assignment to MS1, may select subcarrier frequencies 322B for assignment to MS2, and may select subcarrier frequencies 322C for assignment to MS3. In this way, a more-optimum portion of the channel may be selected for each mobile station for improved throughout. The specific subcarrier assignments may be identified in the uplink map 320.

The size (i.e., number of OFDMA symbols) of the allocated zone 116 may be determined by the scheduler 202 based on the traffic needs of the mobile stations assigned the common group ID. Scheduler 202 may determine the size of the allocated zone 316 based on bandwidth request messages collected from the mobile stations.

In some embodiments, the scheduler 202 may refrain from assigning a common group ID to the mobile stations that do not have an interference level of a common interference source above the predetermined threshold. The scheduler 202 may also allocate bandwidth to mobile stations that do not have an interference level of a common interference source above the predetermined threshold from portions of the uplink subframe 304 that is not within the selected zone 316. These mobile stations that do not have an interference level of a common interference source above the predetermined threshold are less likely to be located near cell edges. In this way, interference can be reduced by scheduling interfering mobile station in different time-domain zones (such as zone 314 or zone 318) of the uplink subframe 304.

Although the embodiments illustrated in FIG. 3 are described with respect to the assignment of zones that are orthogonal in time, this is not a requirement. Embodiments are also applicable to the allocation of zones that are orthogonal in time and/or frequency. In some embodiments, the scheduler 202 may assign zones within the downlink subframe 302 to mobile stations that have a common interference source. In this way, interference on the downlink may also be reduced.

Figure 4:
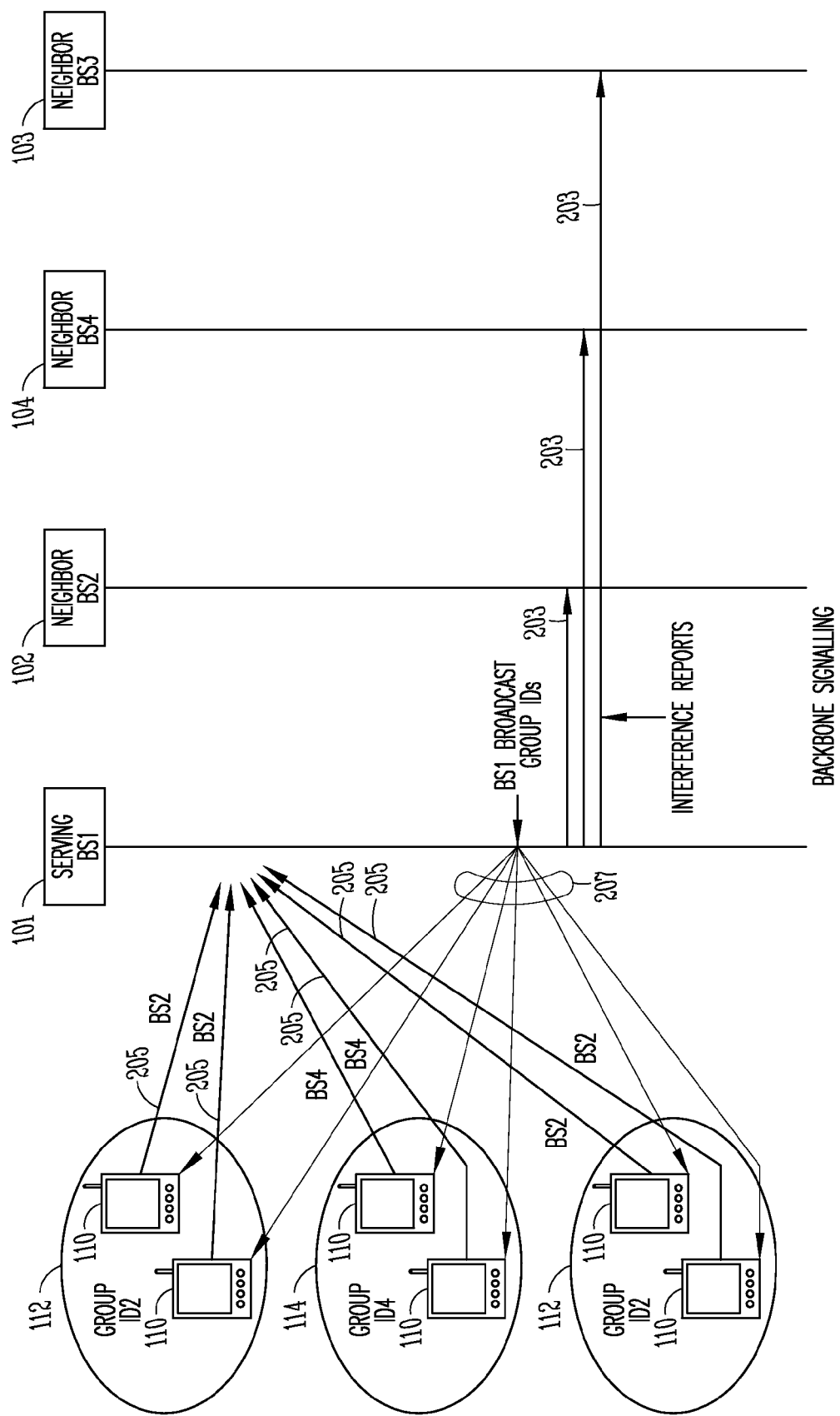
FIG. 4 illustrates backbone signaling in accordance with some embodiments.

FIG. 4 illustrates backbone signaling in accordance with some embodiments. Mobile stations 110 may transmit scan reports 205 to their serving base station 101 to identify one or more interference sources (i.e., neighbor base stations) and the interference levels associated with the interference sources. Serving base station 101 may assign a common group ID to the mobile stations based on interference levels of a common interference source. For example, as illustrated in FIG. 4, serving base station 101 may assign group ID #2 to the four mobile stations in cell-edge region 112 that have identified neighbor base station 102 (BS2) as the common interference source. Serving base station 101 may assign group ID #4 to the two mobile stations in cell-edge region 114 that have identified neighbor base station 104 (BS4) as the common interference source.

Serving base station 101 may allocate bandwidth within a selected zone of an OFDMA uplink subframe 304 (FIG. 3) to the mobile stations assigned the same common group ID for uplink communications with the base station 101 within the OFDMA uplink subframe 304. Serving base station 101 may transmit group ID broadcast messages 207 to the mobile stations that are assigned the common group IDs. The group ID broadcast messages 207 may include the assigned group ID, power control settings, and frequency assignments for each of the mobile stations assigned the common group ID.

Serving base station 101 may also generate interference reports 203 for transmission to a neighbor base station identified as common interference sources over the backbone network 120 (FIG. 1). Each interference report 203 may identify the selected zone of the OFDMA uplink subframe 304 that the serving base station 101 has assigned to the mobile stations that have identified the particular neighbor base station as the common interference source. The interference reports 203 may also identify the particular mobile stations that have been assigned bandwidth within the selected zone 316. In some embodiments, the interference reports 203 may also include information known by the serving base station such as the frequency reuse, the loading and the power.

For example, an interference report 203 transmitted to neighbor base station 102 may, among other things, identify the zone of the OFDMA uplink subframe 304 that mobile stations with group ID #2 are assigned, and an interference report 203 transmitted to neighbor base station 104 may, among other things, identify the particular zone of OFDMA uplink subframe 304 that mobile stations with group ID #4 are assigned. An interference report 203 transmitted to neighbor base station 103 may, among other things, identify the particular zone of OFDMA uplink subframe 304 that mobile stations that have identified neighbor base station 103 as a common interference source have been assigned.

In some TDD embodiments (referring to FIGS. 1-4 together), base stations 101-107 may utilize the same frequency range (i.e., same sets of subcarriers 322) and may time-synchronize their OFDMA frames. In these embodiments, the frequency reuse pattern equals one. In these embodiments, less frequency bandwidth is used compared to other frequency reuse patterns. Base stations 101-107 may operate synchronously such that that their downlink transmissions (i.e., downlink subframes 302) occur simultaneously and such that their uplink transmissions (i.e., uplink subframes 304) occur simultaneously. In this way, the downlink transmissions by one base station do not interfere with uplink transmissions to another base station.

In some joint-scheduling embodiments, in response to receipt of an interference report 203, a neighbor base station, such as neighbor base station 104, may assign a different zone (such as zone 318) of its OFDMA uplink subframe 304 to at least some of its associated mobile stations (i.e., mobile stations 124 (FIG. 1)) that have identified base station 101 as a common interference source. Alternatively, rather than assigning a different zone to some of its associated mobile stations, the neighbor base station 104 may use the information in the interference report 203 to reduce interference.

In some embodiments, when base station 101 receives an interference report 203 from one of the neighbor base stations, the scheduler 202 of base station 101 may use the information in the interference report 203 to reduce interference. For example, the scheduler 202 of base station 101 may select a zone of uplink subframe 304 for allocation of bandwidth to at least some associated mobile stations that is less likely to interfere with the zone indentified in the interference report 203 from the neighbor base station, although the scope of the embodiments is not limited in this respect.

Figure 5:
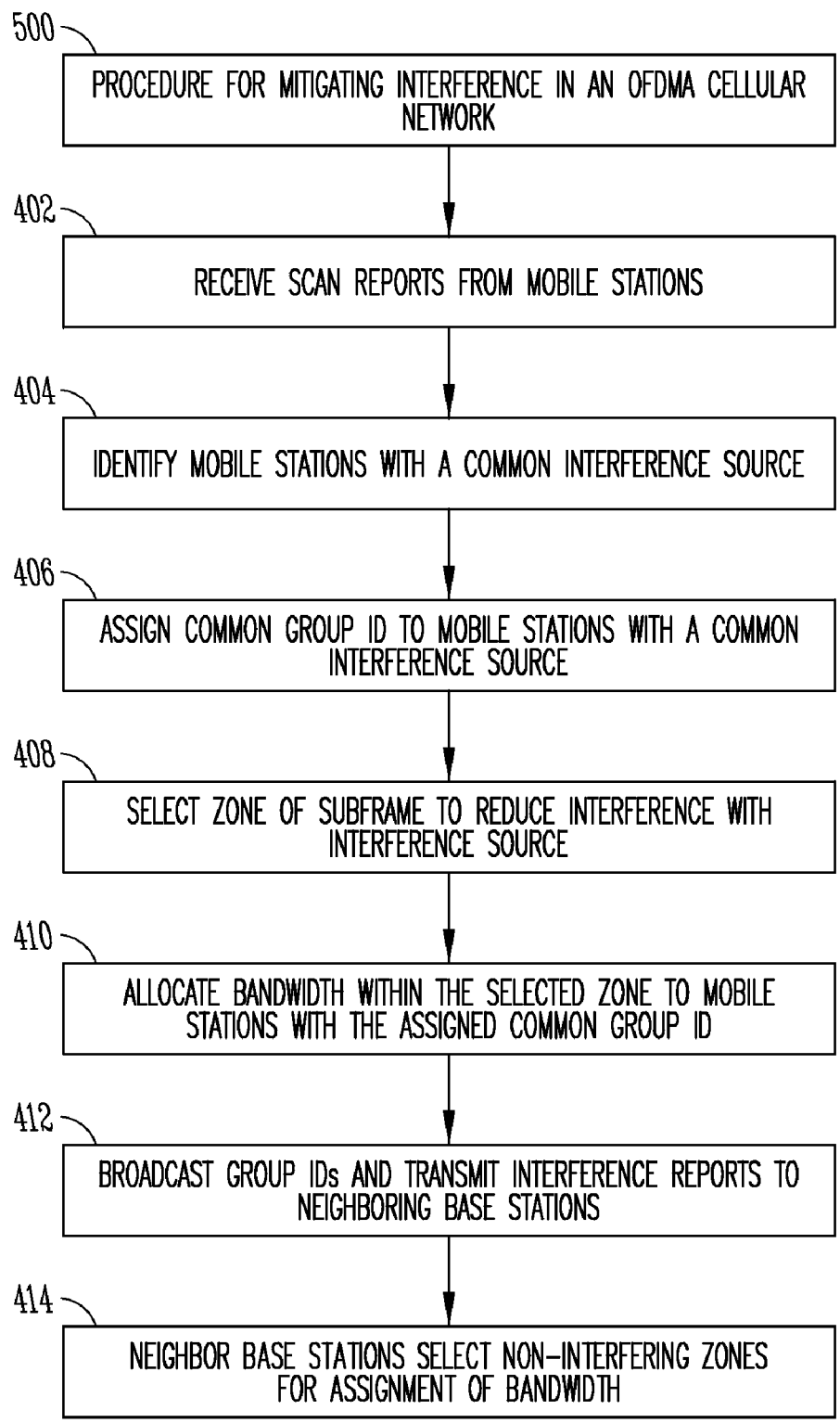
FIG. 5 is a procedure for mitigating interference in an OFDMA cellular network in accordance with some embodiments.

FIG. 5 is a procedure for mitigating interference in an OFDMA cellular network in accordance with some embodiments. Procedure 500 may be performed by one or more base stations, such as base stations 101-107 (FIG. 1) operating in an OFDMA cellular network. In individual-scheduling embodiments, any one base station may perform procedure 500 individually to reduce interference. In joint scheduling embodiments, more than one base station may jointly perform procedure 500 to reduce interference.

In operation 402, scan reports 205 (FIG. 2) may be received by the serving base station from associated mobile stations. The scan reports 205 may identify one or more interference sources and the interference level associated with at least one of the interference sources.

In operation 404, the common interference sources are identified based on an identity of the interference sources from the scan reports 205. In some embodiments, the interference sources may be identified from the BSID.

In operation 406, mobile stations are assigned a common group ID based on interference levels of a common interference source. The common group ID may be assigned to mobile stations when the interference level of the common interference source is above a predetermined threshold.

In operation 408, a zone, such as zone 316 (FIG. 3), of an OFDMA uplink is selected to reduce interference with the common interference source.

In operation 410, bandwidth within the selected zone of the OFDMA uplink subframe is allocated to the mobile stations assigned the common group ID for uplink communications with the serving base station 101 within the uplink subframe 304.

Operation 412 comprises broadcasting a group ID broadcast message 207 (FIG. 2) to the mobile stations 110 that are assigned the common group IDs. As discussed above, the group ID broadcast message 207 is configured to include the assigned group ID, and frequency assignments for each of the mobile stations assigned the common group ID. Operation 412 may also include transmitting interference reports 203 to a neighboring base station identified as a common interference source. The interference report 203 may identify the selected zone of the OFDMA uplink subframe 304 that the serving base station 101 has assigned to mobile stations that have identified the neighbor base station receiving the interference report 203 as the common interference source.

In operation 414, a neighbor base station may attempt to reduce interference based on information received in the interference report 203. For example, in joint-scheduling embodiments, the neighbor base station may select a non-interfering zone (e.g., zone 318 (FIG. 3)) for assignment to mobile stations that have identified the serving base station as an interference source.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A serving base station configured to mitigate uplink interference with neighbor base stations in an orthogonal frequency division multiple access (OFDMA) cellular network by coordination of uplink zone assignments, the serving base station comprising a scheduler configured to:

receive scan reports from associated mobile stations identifying one or more interference sources;

assign a common group identifier (ID) to mobile stations having a common interference source based on interference levels of the common interference source;

a~allocate bandwidth within a selected zone of an OFDMA uplink subframe to the mobile stations assigned the common group ID for uplink communications with the serving base station within the uplink subframe, the selected zone being one of a plurality of orthogonal zones of the OFDMA uplink subframe and within the selected zone the allocated bandwidth comprises an orthogonal channel resource in time and frequency that is allocated to each of the mobile stations having the common group ID for uplink communications within the OFDMA uplink subframe, provide, when a neighbor base station is identified as the common interference source, a report to inform the neighbor base station of the selected zone assignment to cause the neighbor base station to refrain from assigning bandwidth within the selected zone to at least some of its associated mobile stations that have identified the serving base station as an interference source; and initiate transmission of a group ID broadcast message using the assigned common group ID to inform the mobile stations having the assigned common group ID of power control and zone assignment for uplink communications, wherein the serving base station and neighbor base station are configured to time-synchronize their OFDMA frames, and the scheduler comprises one or more processor.

2. The base station of claim 1 wherein the scan reports received from associated mobile stations identify one or more interference sources and the interference level associated with at least one of the interference sources; and wherein the schedule is further configured to identify common interference sources based on an identity of the interference sources from the scan reports.

3. The base station of claim 2 wherein the scheduler is configured to assign a common group ID to mobile stations with a common interference source when the interference level of the common interference source is above a predetermined threshold.

4. The base station of claim 3 wherein the scheduler is further configured to cause the base station to transmit the group ID broadcast message to the mobile stations that are assigned the common group IDs, and wherein the group ID broadcast message is configured to include the assigned group ID, and the zone assignment for each of the mobile stations assigned the common group ID.

5. The base station of claim 4 wherein the scheduler is further configured to assign the orthogonal channel resource to each of the mobile stations with a common group ID based on a channel response determined from a channel sounding signal transmitted by the mobile stations.

6. The base station of claim 1 wherein the cellular network is a 3rd Generation Partnership Project (3GPP) Universal Terrestrial Radio Access Network (UTRAN) Long-Term Evolution (LTE) cellular network and the base station is configured to communicate in accordance with one of the 3GPP UTRAN LTE communication standards, wherein the mobile stations transmit uplink subframes to an associated base station using single-carrier uplinks; and wherein the base stations communicate within downlink subframes to associated mobile stations using multicarrier downlinks.

7. A base station configured to mitigate uplink interference in an orthogonal frequency division multiple access (OFDMA) cellular network, the base station comprising a scheduler configured to:

assign a common group identifier (ID) to mobile stations based on interference levels of a common interference source;

allocate bandwidth within a selected zone of an OFDMA uplink subframe to the mobile stations assigned the common group ID for uplink communications with the base station within the uplink subframe, receive scan reports from associated mobile stations identifying one or more interference sources and the interference level associated with at least one of the interference sources; identify common interference sources based on an identity of the interference sources from the scan reports, assign a common group ID to mobile stations with a common interference source when the interference level of the common interference source is above a predetermined threshold, wherein a neighbor base station that is identified as the common interference source is configured to refrain from assigning bandwidth within the selected zone to at least some of its associated mobile stations that have identified the serving base station as an interference source, wherein the scheduler is configured to refrain from assigning a common group ID to mobile stations that do not have an interference level of a common interference source above the predetermined threshold, and wherein the scheduler is further configured to allocate bandwidth to mobile stations that do not have an interference level of a common interference source above the predetermined threshold from portions of the uplink subframe that is not within the selected zone, and the scheduler comprises one or more processor.

8. A base station configured to mitigate uplink interference in an orthogonal frequency division multiple access (OFDMA) cellular network, the base station comprising a scheduler configured to:

assign a common group identifier (ID) to mobile stations based on interference levels of a common interference source; allocate bandwidth within a selected zone of an OFDMA uplink subframe to the mobile stations assigned the common group ID for uplink communications with the base station within the uplink subframe, receive scan reports from associated mobile stations identifying one or more interference sources and the interference level associated with at least one of the interference sources; identify common interference sources based on an identity of the interference sources from the scan reports, assign a common group ID to mobile stations with a common interference source when the interference level of the common interference source is above a predetermined threshold, wherein a neighbor base station that is identified as the common interference source is configured to refrain from assigning bandwidth within the selected zone to at least some of its associated mobile stations that have identified the serving base station as an interference source, wherein the base station is a serving base station, wherein the scheduler is further configured to generate interference reports for transmission to a neighbor base station identified as common interference sources, and wherein the interference report identifies the selected zone of the OFDMA uplink subframe that the serving base station has assigned to mobile stations that have identified the neighbor base station as the common interference source, and the scheduler comprises one or more processor.

9. The base station of claim 8 wherein the serving base station and the neighbor base station are configured to utilize a same frequency range and time-synchronize their OFDMA frames.

10. The base station of claim 8 wherein in response to receipt of the interference report, the neighbor base station is configured to assign a different zone of the OFDMA uplink subframe to at least some of its associated mobile stations that have identified the serving base station as a common interference source,
wherein the cellular network is a Worldwide Interoperability for Microwave Access (WiMAX) cellular network and the base station is configured to communicate in accordance with one of the IEEE 802.16m specifications using an OFDMA technique comprising time-division multiplexed downlink and uplink subframes.

11. A scheduler to operate in an orthogonal frequency division multiple access (OFDMA) cellular network configured to:
receive interference reports at a serving base station from mobile stations identifying interference sources; assign a common group identifier (ID) to mobile stations having a common interference source based on interference levels of the common interference source; allocate bandwidth within a selected zone of an OFDMA uplink subframe to the mobile stations assigned the common group ID for uplink communications with the serving base station within the uplink subframe, the selected zone being one of a plurality of orthogonal zones of the OFDMA uplink subframe and within the selected zone the allocated bandwidth comprises an orthogonal channel resource in time and frequency that is allocated to each of the mobile stations having the common group ID for uplink communications within the OFDMA uplink subframe, provide, when a neighbor base station is identified as the common interference source, a report to inform the neighbor base station of the selected zone assignment to cause the neighbor base station to refrain from assigning bandwidth within the selected zone to at least some of its associated mobile stations that have identified the serving base station as an interference source; initiate transmission of a group ID broadcast message using the assigned common group ID to inform the mobile stations having the assigned common group ID of power control and zone assignment for uplink communications,
wherein the serving base station and neighbor base station are configured to time-synchronize their OFDMA frames, and the scheduler comprises one or more processor.

12. The scheduler of claim 11 wherein the OFDMA cellular network operations in accordance with a frequency reuse pattern of one,
and
wherein the OFDMA cellular network is a Worldwide Interoperability for Microwave Access (WiMAX) cellular network and the base station is configured to communicate in accordance with one of the IEEE 802.16m specifications using an OFDMA technique comprising time-division multiplexed downlink and uplink subframes.

13. The scheduler of claim 12 wherein the scheduler is configured to:
assign the common group ID to mobile stations with the common interference source when the interference level of the common interference source is above a predetermined threshold; and
cause the serving base station to transmit the group ID broadcast message to the mobile stations that are assigned the common group IDs,
wherein the allocated zone is an orthogonal zone in time of the OFDMA uplink subframe.

14. A method of scheduling uplink communications in an OFDMA cellular network, the method comprising:
receiving scan reports from associated mobile stations identifying one or more interference sources
assigning a common group identifier (ID) by a serving base station to mobile stations having a common interference source based on interference levels of the common interference source;
allocating bandwidth within a selected zone of an OFDMA uplink subframe to the mobile stations assigned the common group ID for uplink communications with the base station within the uplink subframe, the selected zone being one of a plurality of orthogonal zones of the OFDMA uplink subframe and within the selected zone the allocated bandwidth comprises an orthogonal channel resource in time and frequency that is allocated to each of the mobile stations having the common group ID for uplink communications within the OFDMA uplink subframe,
providing, when a neighbor base station is identified as the common interference source, a report to inform the neighbor base station of the selected zone assignment to cause the neighbor base station to refrain from assigning bandwidth within the selected zone to at least some of its associated mobile stations that have identified the serving base station as an interference source;
transmitting a group ID broadcast message using the assigned common group ID to inform the mobile stations having the assigned common group ID of power control and zone assignment for uplink communications,
wherein the serving base station and neighbor base station are configured to time-synchronize their OFDMA frames.

15. The method of claim 14 further comprising:
identifying common interference sources based on an identity of the interference sources from the scan reports; and
assigning the common group ID to the mobile stations with the common interference source when the interference level of the common interference source is above a predetermined threshold.

16. The method of claim 14 wherein the OFDMA cellular network operates in accordance with a frequency reuse pattern of one.

* * * * *

UNITED STATES PATENT AND TRADEMARK OFFICE
CERTIFICATE OF CORRECTION

| | |
|---|---|
| PATENT NO. | : 8,238,323 B2 |
| APPLICATION NO. | : 12/483126 |
| DATED | : August 7, 2012 |
| INVENTOR(S) | : Ali Taha Koc |

It is certified that error appears in the above-identified patent and that said Letters Patent is hereby corrected as shown below:

In the Claims

Column 9, line 25, delete "The base station of claim 1 wherein" and
    insert --The base station of claim 1 wherein the scan--.
Column 9, line 26, delete "the scan reports received from associated mobile stations" and insert
    --reports received from associated mobile stations--.
Column 9, line 64, in claim 1, delete "a~allocate" and insert
    --allocate--, therefor.
Column 11, line 54, delete "pattern of one," and insert --pattern of
    one, and--.
Column 11, line 55, delete "and".
Column 12, line 18, in claim 14, delete "sources" and insert
    -- sources;--, therefor.

Signed and Sealed this
Ninth Day of December, 2014

Michelle K. Lee
*Deputy Director of the United States Patent and Trademark Office*